United States Patent
Mainini

(10) Patent No.: US 9,943,067 B2
(45) Date of Patent: Apr. 17, 2018

(54) PET SPRAY TRAINING SYSTEM

(71) Applicant: Radio Systems Corporation, Knoxville, TN (US)

(72) Inventor: Christopher E. Mainini, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 0 days.

(21) Appl. No.: 14/952,681

(22) Filed: Nov. 25, 2015

(65) Prior Publication Data

US 2017/0142932 A1 May 25, 2017

(51) Int. Cl.
 *A01K 15/02* (2006.01)

(52) U.S. Cl.
 CPC .......... *A01K 15/022* (2013.01); *A01K 15/021* (2013.01)

(58) Field of Classification Search
 CPC .... A01K 15/02; A01K 15/022; A01K 27/009; A01K 15/021; A01K 15/023
 USPC ...... 119/712, 718, 719, 905, 908; 340/573.3
 See application file for complete search history.

(56) References Cited

U.S. PATENT DOCUMENTS

| | | | |
|---|---|---|---|
| 4,627,385 A * | 12/1986 | Vinci | A01K 15/022 119/718 |
| 4,893,580 A | 1/1990 | Joseph et al. | |
| 5,009,192 A | 4/1991 | Burman | |
| 5,214,411 A * | 5/1993 | Herbruck | A01M 29/18 119/174 |
| 5,501,179 A * | 3/1996 | Cory | A01K 15/023 119/712 |
| 5,559,498 A | 9/1996 | Westrick et al. | |
| 5,617,814 A | 4/1997 | Bianco et al. | |
| 5,640,932 A | 6/1997 | Bianco et al. | |
| 5,785,004 A | 7/1998 | Hobbs | |
| 5,868,103 A | 2/1999 | Boyd | |
| 5,911,198 A | 6/1999 | Curen et al. | |
| 6,058,889 A | 5/2000 | Curen et al. | |
| 6,158,392 A | 12/2000 | Andre et al. | |
| 6,263,836 B1 | 7/2001 | Hollis | |
| 6,327,998 B1 | 12/2001 | Andre et al. | |

(Continued)

OTHER PUBLICATIONS

Petsafe Spray Commander Dog Training Collar printed from www.amazon.com on Nov. 27, 2015.

(Continued)

*Primary Examiner* — Yvonne R Abbott-Lewis
(74) *Attorney, Agent, or Firm* — Baker, Donelson, Bearman, Caldwell & Berkowitz, PC

(57) ABSTRACT

An animal behavior modification device is provided. The device includes a sound or motion sensor that is configured to generate electrical signals in response to an occurrence. The device may include a filter, which is tuned to recognize sound frequencies received by and emitted in proximity to a microphone, and generate an electrical signal in response to recognizing sound frequencies characteristic of a dog's bark. The device further includes a canister that holds a deterrent fluid at substantially ambient pressure. The device additionally comprises a pump configured to draw fluid from the canister in response to the electrical signal from the filter. The pump has a spray nozzle for releasing an emission of the fluid that affects the dog's senses. A method of modifying the behavior of an animal using the device is also provided herein.

24 Claims, 5 Drawing Sheets

(56) References Cited

U.S. PATENT DOCUMENTS

| | | | |
|---|---|---|---|
| 6,487,992 B1 | 12/2002 | Hollis | |
| 6,588,376 B1 | 7/2003 | Groh | |
| 6,604,490 B1 | 8/2003 | Lee, IV et al. | |
| 6,651,592 B2 | 8/2003 | Maddox et al. | |
| 6,651,588 B1 | 11/2003 | Penzlmer | |
| 6,668,760 B2 * | 12/2003 | Groh | A01K 15/022 119/718 |
| 6,782,847 B1 | 8/2004 | Shemesh et al. | |
| 6,820,571 B2 | 11/2004 | Cory | |
| 7,021,555 B2 | 4/2006 | Bagnall | |
| 7,174,856 B2 * | 2/2007 | Neri | A01K 15/02 119/712 |
| 7,222,589 B2 | 5/2007 | Lee, IV et al. | |
| 7,462,364 B2 | 12/2008 | Bell | |
| 7,644,685 B2 | 1/2010 | Groh et al. | |
| 7,658,166 B1 * | 2/2010 | Rheinschmidt, Jr. | A01K 15/022 119/712 |
| D622,454 S | 8/2010 | Levy et al. | |
| 7,913,653 B2 | 3/2011 | Jordan | |
| 7,930,993 B2 | 4/2011 | Gross | |
| 7,992,525 B1 * | 8/2011 | Fisher | A01K 15/02 119/860 |
| 8,037,848 B2 * | 10/2011 | Mushenski | A01K 15/02 116/139 |
| 8,051,806 B2 * | 11/2011 | Mushenski | A01K 15/02 116/139 |
| 8,091,512 B2 | 1/2012 | So | |
| 8,342,134 B2 | 1/2013 | Lee, IV et al. | |
| 8,438,999 B2 | 5/2013 | Hardi et al. | |
| 8,714,113 B2 | 5/2014 | Lee, IV et al. | |
| D714,498 S | 9/2014 | Khubani | |
| 8,947,240 B2 * | 2/2015 | Mainini | A01K 15/021 119/712 |
| 9,185,884 B2 * | 11/2015 | Herrmann | A01K 15/02 |
| 9,398,756 B2 * | 7/2016 | Eckert | A01K 27/009 |
| 2003/0136353 A1 * | 7/2003 | Cory | A01K 15/02 119/712 |
| 2015/0196010 A1 * | 7/2015 | Orubor | A01K 27/004 119/72 |

OTHER PUBLICATIONS

Petsafe Elite Little Dog Spray Bark Collar printed from www.petsafe.net on Nov. 27, 2015.

Petsafe Elite Big Dog Spray Bark Collar printed from www.petsafe.net on Nov. 27, 2015.

Petsafe Gentle Spray Anti-Bark Collar printed from www.petsafe.net on Nov. 27, 2015.

Petsafe Ssscat Spray Deterrent printed from www.petsafe.net on Nov. 27, 2015.

* cited by examiner

PET SPRAY TRAINING SYSTEM

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of pet training. More particularly, the invention relates to an improved portable spray device used as an aversive for animal behavior modification, such as controlling the barking of pet dogs.

TECHNOLOGY IN THE FIELD OF THE INVENTION

Many people who live in populated areas enjoy the companionship of dogs. Such individuals frequently live in apartment complexes, condominium complexes, garden home communities, zero lot line homes, lofts or high rise developments. In these instances, residents are living in close proximity to one another. Such close living arrangements may provide a feeling of community, may provide a convenient location for work, may provide affordable housing, may provide for a low-maintenance lifestyle, or may provide a lifestyle deemed to be vibrant or culturally stimulating.

At the same time, dog owners living in these circumstances face the challenge of controlling excessive or unwanted barking. In this respect, dogs have a habit of barking at strange noises, either as a protective habit or out of unwarranted fear or territorialism. Dogs also bark at other pets and at people. Such barking is a nuisance to neighbors living close by, and even to the dog owners themselves. This can produce conflicts between neighbors, and even litigation where barking is deemed to be a nuisance.

Various techniques have been developed to control the barking of a dog. First, barking can be controlled by the surgical removal of the larynx. However, this solution is usually unacceptable to pet owners as unnecessarily cruel and expensive. Second, standard obedience techniques can be used to train a dog not to bark, but this is time consuming and often requires the presence of the owner to correct the dog. If the owner is absent from the home for long periods of time, such as at work, the dog may learn to refrain from barking only when the owner is present, remaining a nuisance while the owner is away. Third, a muzzle can be utilized to prevent a dog from barking. However, the muzzle must be periodically removed to allow the dog to eat or drink which restores the need for supervision. Finally, remote and automatic systems using various trigger mechanisms (primarily electrical stimuli) have been developed to control the barking of a dog. However, not every pet owner wants to apply electrodes to the throat of a pet, particularly when the pet is small.

One technique that has proved successful and that has been deemed particularly humane is the use of a spray canister. U.S. Pat. No. 4,627,385 entitled "Bark Restraining Device for Dogs" discloses a collar unit having an electronic circuit. The circuit includes a microphone with a filter, such as the filter shown in U.S. Pat. No. 8,714,113. Such a filter is sensitive to frequencies that correspond to those of the bark of a dog. The '113 patent is incorporated herein by reference in its entirety. When barking is sensed, the circuit actuates a valve that is associated with a pressurized tank of compressed gas or other fluid. When activated, the valve releases a spray of the fluid from a tank in the region of the head of the dog. The substance is designed to affect the senses of the dog, particularly the sense of smell.

In one aspect of the '385 patent, the electronic circuit is responsive to a signal from a remote transmitter carried by the pet owner or a trainer. The remote transmitter is shown in FIG. 7 of the '385 patent. The transmitter permits the owner or trainer to remotely actuate the release of the spray as part of the training of the dog. U.S. Pat. No. 4,627,385 is also incorporated herein by reference in its entirety.

Since the '385 patent issued in 1986, a variety of "spray trainers" have been placed on the market. Some spray trainers are associated with a dog collar, while others (typically directed towards cats) represent free-standing spray canisters equipped with motion sensors. In any of these instances, pressurized canisters having a solenoid release mechanism have been used. The canisters are filled in a "clean room," under pressure, at the factory before packaging for sale.

Pressurized canisters have fallen under regulatory scrutiny. Regulations have been promulgated concerning the storage, disposal, contents, use and shipping of pressurized canisters. Customs, shipping lines and the Code of Federal Regulations all impose various regulations that increase costs associated with compliance. In addition, collar-mounted pressurized spray reservoirs, particularly those that include a refill valve, a separate spray valve and a solenoid releasing mechanism, can be difficult to produce in high volume. Also, reliability of the canisters is sometimes poor due to leaking around the high pressure seals or contamination of the release valve.

The compressed gases that are used as propellants in these products may also fall under various regulations. For example, in consideration to the environment, certain propellants have migrated from R-12 to R-32A propellants.

Accordingly, a need exists for an improved spray mechanism used for training pets that does not rely upon a pre-pressurized canister. Further, a need exists for a spray training mechanism that takes advantage of recent technical improvements in small electrical pumps.

BRIEF SUMMARY OF THE INVENTION

An animal behavior modification device is first provided herein. In one embodiment, the animal behavior modification device includes a microphone. The microphone is configured to receive sound frequencies, and to generate electrical signals in response.

The device also includes a filter. The filter is tuned to recognize sound frequencies received by and emitted in proximity to the microphone. The filter is part of circuitry that generates an electrical behavior modification signal in response to recognizing sound frequencies characteristic of the bark of a dog.

The device further includes a first canister. The first canister holds a bark deterrent fluid at substantially ambient pressure. Preferably, the bark deterrent fluid comprises a solution that stimulates one or more senses of a dog. For example, the solution may be sensed by the dog's sense of smell, hearing or touch. In one aspect, the stimulation is an offensive or "aversive" stimulation.

The device additionally comprises a pump. The pump has an electrical motor configured to draw fluid from the canister in response to the electrical signal from the filter. The pump has a fluid intake for drawing the bark deterrent fluid from the first canister, and a spray nozzle for releasing a stream of the fluid when the electrical motor is activated. In one aspect, the spray nozzle is adjustable to generate a range of flow streams of the bark deterrent fluid. Preferably, the pump is a micro-positive displacement pump or a continuous stream pump.

The device also has a battery. The battery is arranged to provide power to the electrical motor and any other electrical components, such as an optional wireless receiver or programmable logic controller.

Preferably, the animal behavior modification device also includes a housing. The housing is configured to hold at least the microphone, the filter, the pump and the battery. The housing includes a connector, such as a loop or slot, for connecting the housing to the collar (including a harness) of a dog.

In one embodiment, the device communicates with a remote transmitter. The transmitter is configured to send a wireless bark deterrent signal in response to manual actuation, such as a pet owner pushing a button. The device also includes a receiver located on the collar. The receiver is configured to receive the bark deterrent signal, and in response generate an electrical behavior modification signal. The electrical motor is configured to draw fluid from the first canister in response to the electrical behavior modification signal from the receiver, and cause a stream of the bark deterrent fluid to be released through the spray nozzle. In this way, the device can also be manually and remotely operated.

In another embodiment, the device is part of a system that includes a remote transmitter. The transmitter is configured to send a wireless bark deterrent signal in response to on-board bark sensing and filtering electronics, such as a stationary bark-sensing and transmitting device. The device also includes a receiver co-located on the collar. The receiver is configured to receive the bark deterrent signal as transmitted by the stationary bark sensing device, and in response, generate an electrical behavior modification signal. The electrical motor is configured to draw fluid from the first canister in response to the electrical behavior modification signal from the receiver, and cause a stream of the bark deterrent fluid to be released through the spray nozzle. In this way, the device can also be automatically controlled and can automatically discourage barking in particular locations.

In yet another embodiment, the device is generally stationary and includes a microphone, filter, pump, electric motor and fluid canister. The microphone is configured to receive sound frequencies and to generate electrical signals in response to recognizing sound frequencies characteristic of the bark of a dog. The electrical motor is configured to draw fluid from the canister in response to the electrical signal from the microphone/filter, and to cause a stream of fluid to be released upon the recognition of a bark. In this way, the device can also be automatically controlled and automatically discourage barking in particular locations where the system is located.

In yet another embodiment, the system is generally stationary and includes a motion sensor, filter, pump, electric motor and fluid canister. The motion sensor is configured to receive motion signals and to generate electrical signals in response to sensing motion characteristic of the movement of a pet. The electrical motor is configured to draw fluid from the canister in response to the electrical signal from the motion sensor, and cause a stream of fluid to be released upon the recognition of pet movement in an area. In this way, the device can also be automatically controlled and automatically discourage the presence of a pet in particular locations where the system is located.

In still another embodiment, the device comprises a second canister containing a behavior reinforcement fluid, wherein the behavior reinforcement fluid comprises a solution that is pleasing to a dog's sense of smell to provide positive reinforcement. A remote transmitter is again offered, which is configured to send a behavior reinforcement signal in response to manual actuation to a receiver. The electrical motor is configured to draw fluid from the second canister in response to the electrical behavior modification signal from the receiver, and cause a stream of the behavior reinforcement fluid to be released through the spray nozzle.

In another embodiment, the device further comprises a tone generation element that can be used independently or in concert with either the deterrent fluid or the reinforcement fluid. The generated tone may be a deterrent town or a reinforcement tone, used with the deterrent fluid or the reinforcement fluid, respectively.

A method for modifying the behavior of an animal is also provided herein. The method employs the animal behavior modification device described above, in any of its various embodiments.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 3 shows a remote transmitter that communicates with the device via wireless signals.

FIG. 4 shows a stationary receiver that communicates with the device via wireless signals.

FIG. 5 shows a stationary system with a microphone.

FIG. 6 shows a stationary system with a motion detecting sensor.

FIG. 7 also shows a stationary system with a motion detecting sensor.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below.

DESCRIPTION OF SELECTED SPECIFIC EMBODIMENTS

Figure 1:
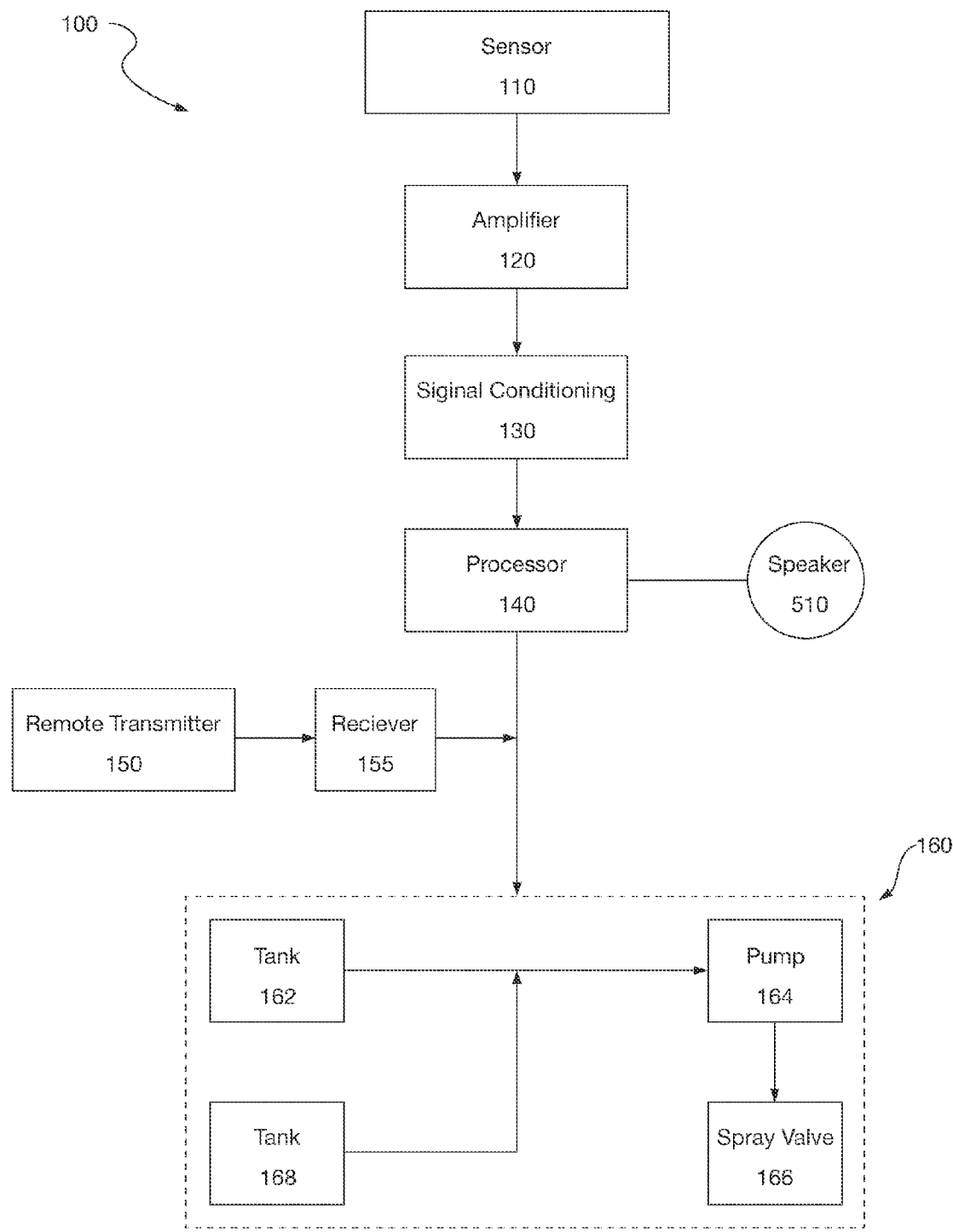
FIG. 1 is a schematic view of the animal behavior modification device of the present invention, in one embodiment.

FIG. 1 is a schematic view of an animal behavior modification system or device 100 of the present invention, in one embodiment. A plurality of components for the device 100 are shown. The components are intended to reside on the collar of a dog. An illustrative collar is shown at 300 in FIG. 3, placed around a pet 350. It is understood that the term "collar" may include a harness.

Referring back to FIG. 1, the device 100 first includes a sensor 110. The sensor 110 may be any device that is responsive to the bark of the dog. In one embodiment, the sensor 110 is a piezoelectric vibration sensor that is in contact with the dog for measuring vibrations produced by the dog. The piezoelectric sensor is a low current device used for detecting the barking of a dog. In one aspect, the sensor 110 is placed in contact with the throat of the dog so as to measure vibrations produced by the vocal cords of the dog. Such an embodiment is described in detail in U.S. Pat. No. 6,668,760 entitled "Spray Control Anti-Bark Collar," the entirety of which is incorporated herein by reference in its entirety.

In a more preferred embodiment, the sensor 110 is a microphone. The microphone 110 is configured to receive sound frequencies emitted in proximity to the dog collar. In response, the microphone 110 generates electrical signals.

The electrical signals are taken through a conditioning process. In one aspect, this includes amplification. Thus, the animal behavior modification device 100 may also include an amplifier 120. The amplifier 120 is coupled to the sensor 110 and amplifies the output of the vibration (or sound) sensor 110 to increase the level of the sensor output for further processing and more accurate sampling.

The animal behavior modification device 100 optionally includes a circuit 130 for further signal conditioning of the output of the amplifier 120. The signal conditioning circuit 130 serves to discriminate among the vibrations or sound frequencies measured by the sensor 110 so as to pass only measured vibrations or frequencies that meet specified criteria. For example, the signal conditioning circuit 130 may be configured to filter out frequencies not indicative of the bark of a dog, or to pass only those vibrations occurring within a specified frequency range or those meeting certain durational limits. The signal conditioning circuit 130 may be configured to remove unwanted components of the sensor 110 output. Those skilled in the art will recognize the various filters, amplifiers and other signal conditioning devices that can be used to prepare the measured frequencies or vibrations for further processing. Those skilled in the art will also recognize that the type of signal conditioning depends upon the input signal, the corresponding sensor and the desired characteristics of the input signal that are to be monitored. For example, the signal conditioning or filter may be active or passive and may be set to pass a specific frequency range or to remove high or low frequency noise. Further, depending upon the various components used, the output signal may not require additional amplification. Finally, other conditioning may be required to present a useable sensor output to the remainder of the circuit.

As part of the filter 130, a controller or processing device 140 monitors the amplified output and activates a stimulus delivery mechanism 160. In the present invention, the stimulus delivery mechanism 160 is a so-called spray trainer. Decision-making logic within the processor 140 determines whether a spray is needed through the actuation of the stimulus delivery mechanism 160. Typically, the input to the processor 140 is compared against a reference value to determine whether a spray-type stimulus is warranted. A conventional processing device 140 includes an internal timer, memory registers and math capabilities allowing sophisticated signal processing to occur; however, those skilled in the art will recognize that these capabilities can be achieved using other components without departing from the spirit and scope of the present invention, such as through firmware. Further, those skilled in the art will recognize that the electrical components used depend on various factors including the cost of manufacture, size and weight constraints and the complexity of the decision process. For example, the size and weight of the training collar worn by the animal is reduced by implementing the controller in a single application specific integrated circuit (ASIC) or a microprocessor, both of which allow complex decision making capabilities. For lower cost, larger units implementing a simple decision tree, an array of discrete logic components can be used.

In the illustrated embodiment 100, the stimulus delivery mechanism 160 is a spray mechanism that delivers a controlled dose of a bark deterrent substance, or fluid. The spray delivery mechanism 160 includes a first canister 162, a pump 164 and a spray valve or nozzle 166. The bark deterrent substance is held within a substantially non-pressurized container, and represents a solution that affects the olfactory (or other) senses of the dog.

The deterrent substance is selected to be irritating or disturbing to the dog. A commonly used deterrent stimulus is a citronella liquid; however, those skilled in the art will recognize other deterrent substances that can be used without departing from the scope and spirit of the present invention, for example compressed air or water. In addition, those skilled in the art will recognize that the sound of the substance escaping under pressure provides a secondary deterrent function. Thus, in one aspect the spray delivery mechanism 160 also includes a speaker. The speaker is configured to emit a sound that emulates a spray of fluid in response to conditioned electrical signals from the filter indicative of the bark of a dog.

Various types of pumps 164 may be used for drawing fluid from the canister 162 and through a pump inlet. For example, either single stroke or double stroke pumps may be used.

Figure 2A:
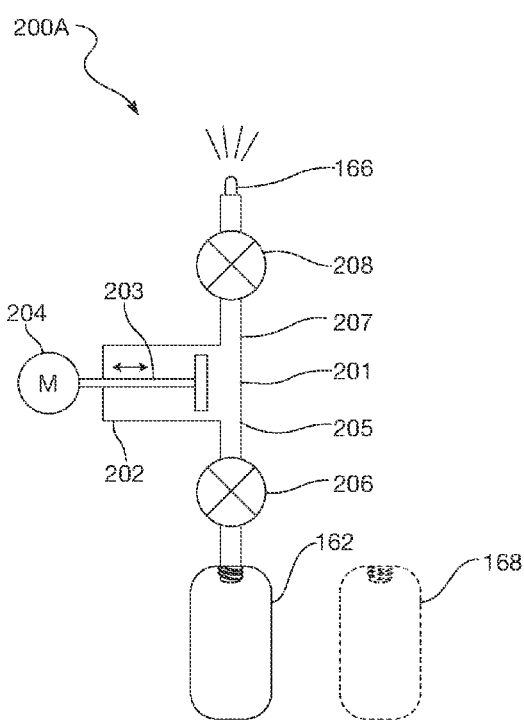
FIG. 2A is a schematic view of a single stroke electromechanical pump as may be used in connection with the animal behavior modification device of FIG. 1, in one embodiment.

FIG. 2A is a schematic view of a single stroke electromechanical pump 200A as may be used in connection with the animal behavior modification device of FIG. 1, in one embodiment. The pump 200A includes a plenum 201 having a piston cylinder 202 in which resides a reciprocating piston 203. The piston 203 is coupled to a motor 204 which reciprocates the piston 203 within the cylinder 202. The pump 200A includes an inlet 205 in fluid communication with the plenum 201 through a first check valve 206, and an outlet 207 in fluid communication with a nozzle 166 through a second check valve 208.

The pump inlet 205 is in fluid communication with canister (or tank) 162 so that the fluid within the canister 162 is withdrawn through the actuation of the motor 204. The pump outlet 207 is in fluid communication with nozzle (or spray valve) 166 so that fluid is expelled under pressure from the nozzle 166 through actuation of the pump 200A.

In use, as the pump piston 203 is moved from a compressed position to a decompressed position, the first check valve 206 is open while the second check valve 208 is closed. The decompressed movement of the piston 203 creates low pressure within the plenum 201. This, in turn, draws bark deterrent fluid from the tank 162 and into the plenum 201. As the piston 203 transitions to a compression stroke, the first check valve 206 is closed while the second check valve 208 is open. The compression movement of the piston 203 rapidly raises the pressure within the plenum 201, which forces the bark deterrent fluid through the nozzle (or spray valve) 166 for a designated time period as programmed into the processing device 140. The operation of this type of pump creates a pulse stream or spray of fluid.

Figure 2B:
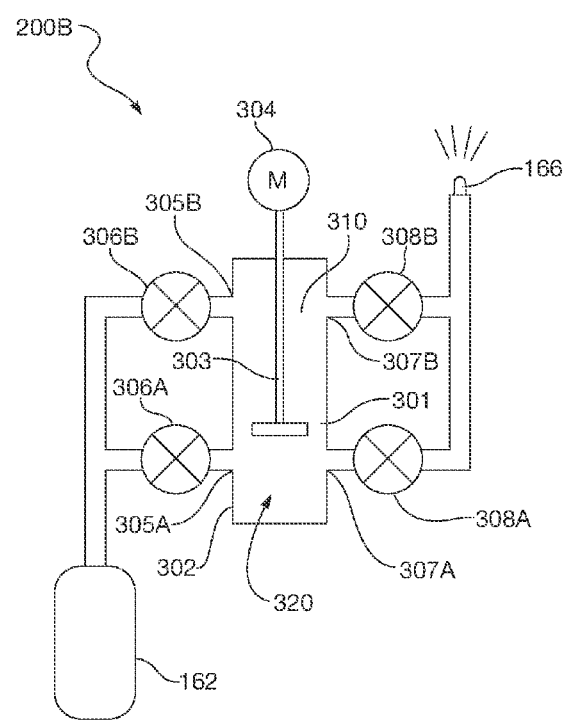
FIG. 2B is a schematic view of a double stroke electromechanical pump as may alternatively be used in connection with the animal behavior modification device of FIG. 1.

FIG. 2B is a schematic view of an electro-mechanical pump 200B as may be used in connection with the animal behavior modification device 100 of FIG. 1, in an alternate embodiment. Here, the pump 200B represents a double stroke electro-mechanical pump.

The pump 200B includes a plenum 301 having a piston cylinder 302 in which resides a reciprocating piston 303. The piston 303 divides the piston cylinder 302 between an upper portion 310 and a lower portion 320. The piston 303 is coupled to a motor 304 which reciprocates the piston 303 back and forth within the cylinder 302. The pump 300A includes a first inlet 305A in fluid communication with the plenum 301 through a first check valve 306A, and an outlet 307A having a second check valve 308A. The pump 300A also includes a second inlet 305B in fluid communication with the plenum 301 through a third check valve 306B, and a second outlet 307B associated with a fourth check valve 308B.

The pump inlets 305A, 305B are in fluid communication with a tank (or canister) 162 so that the fluid within tank 162 is withdrawn through the actuation of the motor 304. The pump outlets 307A, 307B are in fluid communication with the nozzle (or spray valve) 166 so that fluid is expelled under pressure from the nozzle 166 through actuation of the motor 304.

At the beginning of a cycle, the pump piston 303 is located along a lower portion 320 of the plenum 301, is moved upwardly from the lower portion 320 (a compressed position) to an upper portion 310 (a decompressed position). At this point, the first check valve 306A (associated with the first inlet 305A) is opened and the second check valve 306B (associated with the second inlet 305B) is closed. At the same time, the second check valve 308A (associated with the first outlet 307A) is closed while the fourth check valve 308B (associated with the second outlet 307B) is opened.

The sealed upward movement of the piston 303 creates low pressure within the cylinder lower portion 320 (below the piston 303). This, in turn, draws the bark deterrent fluid from the tank 162, through the first check valve 306A, and into the cylinder lower portion 320. At the same time, higher pressure is created within the plenum, 301 above the piston 303, forcing fluid from the upper portion 310, where fluids then travel through the second outlet 307B, through the fourth check valve 308B and out the spray nozzle 166.

To complete the cycle, the piston 303 transitions back from its upper position 310 down to its lower position 320. The first check valve 306A is closed and the second check valve 308A is opened, while the third check valve 306B is opened and the fourth check valve 308B is closed. The compression movement of the sealed piston 303 creates lower pressure in the upper portion 310, which draws fluids into the plenum 301 through the second inlet 305B and through the third valve 306B above the piston 303. This simultaneously creates high pressure within the plenum 301 below the piston 303, expelling fluids through the first outlet 307A, through the second check valve 308A and then up through the nozzle 166.

The operation of this type of double acting pump 200B creates a generally continuous stream of fluid for a designated time period which is programmed into the processing device 140. Fluid is expelled during both directional movements of the piston 303. This continuous stream (of FIG. 2B) is preferable over the intermittent stream of a single acting pump 200A (of FIG. 2A). As used herein, the term continuous stream or spray is intended to denote a stream which is generally continuous in nature, as opposed to an intermittent or pulsating stream of fluid.

Either pump 200A or pump 200B may be modified to create a positive-displacement pump. In one aspect, a very small positive displacement pump, or so-called micro-PD, may be used. Micro-PD's are sometimes used in chip fabrication, and offer high-precision, single- or multi-piston pumps with adjustable flow rates. Micro-pumps are available from, for example, Crane Engineering of Kimberly, Wis. and Sono-Tek Corporation of Milton, N.Y.

Figure 2C:
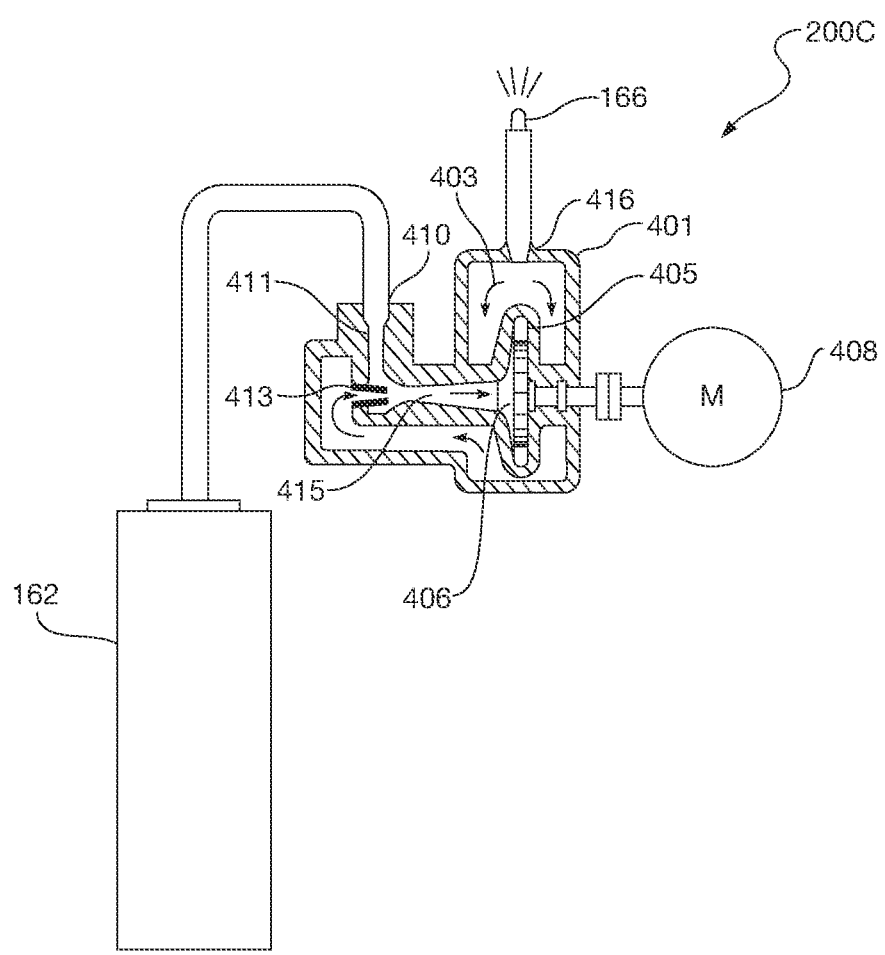
FIG. 2C is a schematic view of a jet driven electromechanical pump as may alternatively be used in connection with the animal behavior modification device of FIG. 1.

Yet another type of pump that may be used for the device 100 of FIG. 1 is a jet spray pump. FIG. 2C is a cross-sectional view of an electro-mechanical jet pump 200C as may be used in connection with the animal behavior modification device 100 of FIG. 1. The pump 200C includes a housing 401 defining an internal fluid chamber 403 and encasing an impeller chamber 405 in which is mounted an impeller 406. The impeller 406 is coupled to a motor 408 which rotates the impeller 406 within the impeller chamber 405.

The pump housing 401 includes a fluid inlet 410. The fluid inlet is in fluid communication with an internal fluid passage 411 which terminates in the vicinity of a venturi 413 located within a second internal fluid passage 415. Rotation of the impeller 406 creates a low pressure sink, which pulls or draws the bark deterrent fluid from the tank (or canister) 162 into the fluid inlet 410. The housing 401 also includes a fluid outlet 416 through which the pressurized fluid is expelled to the nozzle (or spray valve) 166.

In use, as the impeller 406 rotates within the impeller chamber 405, fluid is drawn from the tank 162 and into the fluid inlet 410. The fluid is pressurized by the action of the impeller 406 and is expelled through the fluid outlet 416 where it forms a spray by the nozzle 166. Ideally, the nozzle 166 may be adjusted by changing the size or shape of an orifice, to create a range of spray types providing different fluid densities and volumes. The operation of this type of jet or impeller pump also creates a generally continuous stream or spray of fluid for a designated time period programmed into the processing device 140, and as such is preferable to the intermittent stream of a single acting pump of FIG. 2A.

Based on the above description of the animal behavior modification device 100 and pumps, a method for modifying the behavior of an animal is offered herein. In one embodiment, the method first includes providing an animal behavior modification device. The animal behavior modification device may be arranged in accordance with any of the embodiments described above. Of interest, the device 100 includes a pump 164 having an electrical motor configured to draw fluid from the first canister 162 in response to the electrical signal from the filter (120, 130 and/or 140). The pump 164 comprises a fluid intake for drawing a bark deterrent fluid from the first canister 162, and a spray nozzle 166 for releasing a stream of the bark deterrent fluid when the electrical motor (204, 304 or 408) is activated. In this way, the pump 164 does not employ a pressurized canister. Preferably, the pump is a micro-positive displacement pump.

The method next includes securing the animal behavior modification device 100 to a collar. As noted above, a collar is shown at 300, affixed to a dog 350. Securing the device 100 to a collar 300 of a dog 350 preferably comprises connecting the housing to the collar 300. The device 100 is positioned so that as the stream of bark deterrent fluid is released from the spray nozzle, the fluid affects the dog's senses, such as smell and touch.

In one aspect, the bark deterrent fluid comprises a solution that is offensive to one or more senses of a dog. For example, the fluid may contain a component that presents an offensive smell. In another example, the fluid contains a component that temporarily stimulates the dog's senses of smell, hearing or touch. For example, the stimulant may be a deterrent fluid that mildly irritates the dog's eyes or nose.

In one aspect, the animal behavior modification device 100 further comprises a speaker 510. The speaker 510 is configured to emit a sound that emulates a spray of fluid. The sound is emitted in response to conditioned electrical signals from the filter 130 indicative of the bark of a dog. In this instance, the sense will be the sense of hearing.

In one embodiment, the method also includes removing the first canister 162 from the fluid intake when the bark deterrent fluid is substantially exhausted, and then refilling the canister with additional bark deterrent fluid. This is done at ambient conditions. A pre-pressurized canister is not required, and no pressurization step is taken. Alternatively, the old canister may be re-filled.

In one embodiment, the method further comprises adjusting the spray nozzle. Adjusting the spray nozzle may mean adjusting the nozzle to create a fine mist or, alternatively, a heavy fluid stream of the bark deterrent fluid.

In one aspect, the animal behavior modification device 100 further comprises a remote transmitter (seen in FIG. 1 at 150) The remote transmitter 150 is configured to send a wireless activation signal in response to manual actuation by a trainer or pet owner. The signal is sent to a receiver 155 associated with the device 100.

Figure 3:
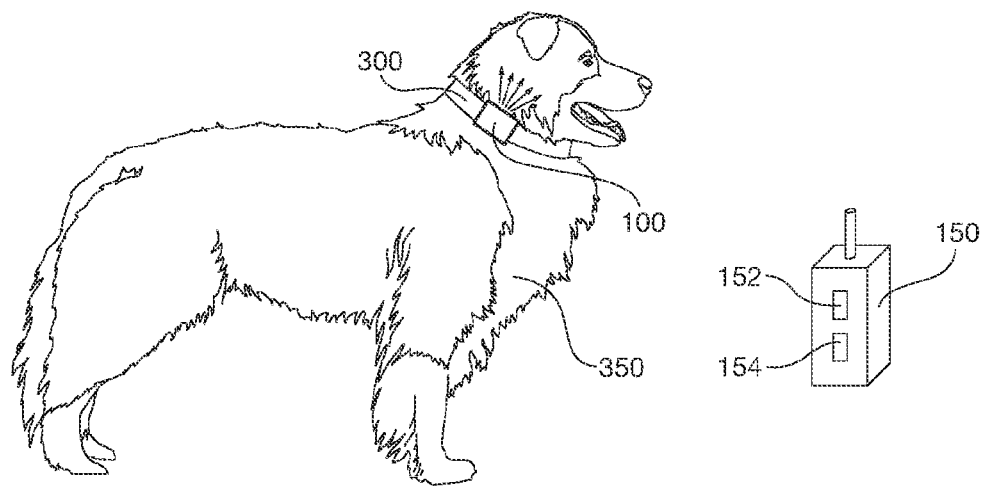
FIG. 3 is a schematic view of the animal behavior modification device of FIG. 1, affixed to a pet dog.

FIG. 3 illustrates use of the animal behavior modification device 100 of FIG. 1, with a remote transmitter. The remote transmitter 150 is intended to be held and used by an owner or trainer (not shown). In this arrangement, the device 100 is shown secured to a collar 300 placed around a dog 350.

In this instance, the device 100 will further include the receiver 155 configured to receive wireless activation signals sent manually by the operator of the remote transmitter 150, and in response generate an electrical behavior modification signal. The electrical motor is configured to activate the pump 164, and draw fluid from the first canister 162 in response to the electrical behavioral modification. This, in turn, causes a stream of the bark deterrent fluid to be released through the spray nozzle 166.

Button 152 is shown in FIG. 3, indicating a button that may be pushed by the pet owner or trainer to manually and remotely actuate the pump 164. Pushing button 152 sends a bark deterrent signal, which ultimately causes the spray mechanism 160 to emit the deterrent spray through the nozzle 166.

In one embodiment, the animal behavior modification device 100 further comprises a second canister 168. The second canister 168 contains a behavior reinforcement fluid. The behavior reinforcement fluid comprises a solution or otherwise contains a component that is pleasing to a dog's sense of smell. In this instance, the device 100 may again include a remote transmitter 150 configured to send a wireless activation signal in response to manual actuation, and a receiver 155 configured to receive the wireless activation signal. Here, the wireless activation signal is a behavior reinforcement signal. Pushing button 154 sends a behavior reinforcement signal, which ultimately causes the spray mechanism 160 to emit the reinforcement spray through the nozzle 166.

In response to the signal, an electrical behavior modification signal is sent to the pump 164 (or more accurately, to the motor in the pump). Here, the electrical motor is configured to activate the pump for a period of time to draw fluid from the second canister 168. This, in turn, causes a stream of the behavior reinforcement fluid to be released through the spray nozzle 166.

In one arrangement, each of the canisters (or tanks) 162, 168 is fabricated from a bio-degradable material, such as a bioplastic. Examples include cellulose esters, polybutylene succinate (PBS), polyanhydrides, polyhydroxyalkanoates (PHA's), lignin based plastics and polylactic acid (PLA).

Figure 4:
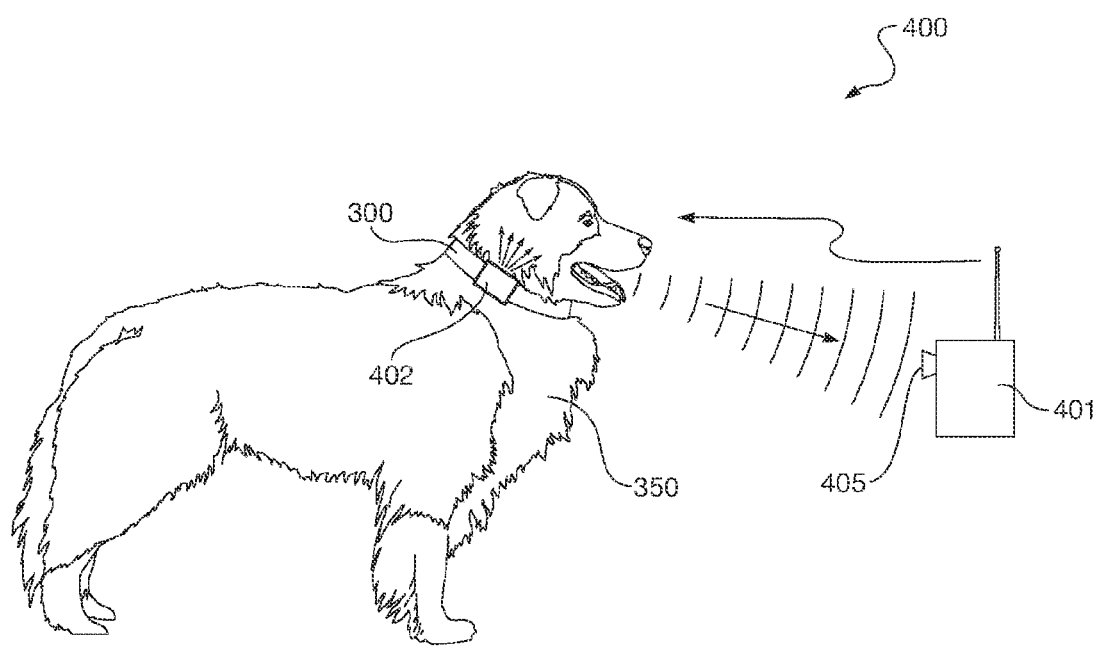
FIG. 4 is a schematic view of the animal behavior modification device of FIG. 1, affixed to a pet dog.

Variations of the method for modifying the behavior of an animal using a behavior modification device may fall within the spirit of the claims, below. For example, in one embodiment the pet training device may be set up as two different components, with one component housing the tank(s) 162, 168 and associated pump 164, and another component housing the sound detection device and associated signal processing circuitry. FIG. 4 illustrates a pet training device 400 in such an embodiment. Here, the pet training device 400 includes a remote transmitter 401 housed separately and apart from the collar mounted spray device 402.

The remote transmitter 401 includes a sound detector 405, in the form of a microphone. The remote transmitter 401 is configured to send a wireless activation signal in response to the detection of recognized frequencies characteristic of the bark of a dog or other designated sound. The wireless activation signal is received by the collar mounted spray device 402, which then automatically actuates the electrical motor to activate the pump 164 and draw fluid from the canister 162. This, in turn, causes a stream of the bark deterrent fluid to be automatically released through the spray nozzle 166. Thus, a person does not have to be present to active the remote transmitter 401. Accordingly, the remote transmitter may be placed in an area wherein the dog is taught not to bark such as a bedroom or nursery. At the same time, the dog's bark does not activate the system should the barking occur outside the range of the remote transmitter.

Figure 5:
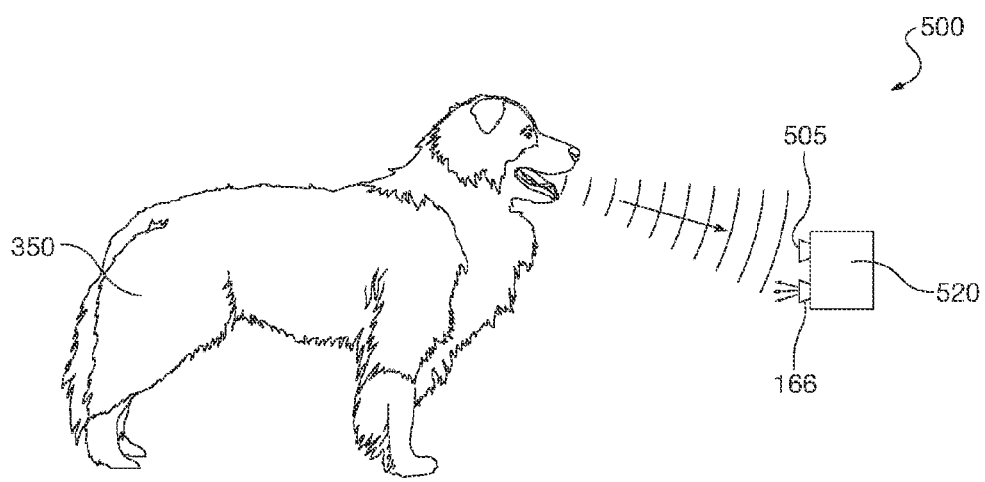
FIG. 5 is a schematic view of the animal behavior modification device of FIG. 1, shown with a pet dog.

In a related arrangement, all components of the pet spray training device are housed in a single remote housing that is apart from an animal collar. FIG. 5 illustrates a pet training device 500 in such an embodiment. The pet training device 500 is separate and apart from the pet 350 to be trained and is therefore referenced herein as stationary or free-standing even though it may be moved to different locations.

The device 500 is similar to the previously disclosed device 400 except that it is not coupled to a collar worn by the pet 350. This is ideal for pets who do not wear a collar. Here, the device 500 includes a sound detector 505, in the form of a microphone and filter. The microphone 505 is configured to send an activation signal in response to the detection of recognized frequencies characteristic of the bark of a dog or other designated sound. The activation signal automatically actuates the electrical motor to activate a pump 164 and draw fluid from the canister 162. This, in turn, causes a stream of the bark deterrent fluid to be automatically released through the spray nozzle. 166 Thus, a person does not have to be present to activate the device 500.

The device 500 may be placed in an area wherein the dog is taught not to bark. Examples again include a nursery or a bedroom. Other examples include a kitchen or dining room. The dog's bark does not activate the system should the barking occur outside the range of the microphone 505. In the arrangement for the device 500, components are all held within a single housing 520.

Figure 6:
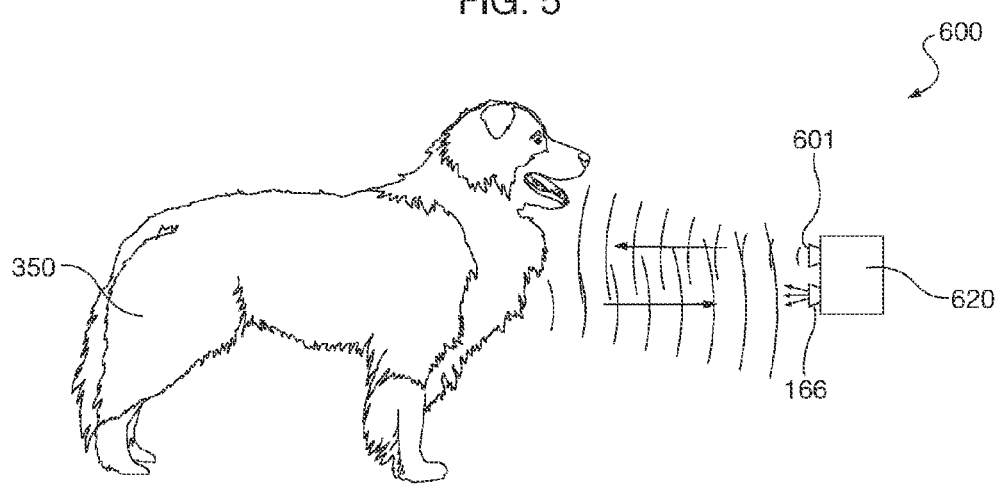
FIG. 6 is a schematic view of the animal behavior modification device of FIG. 1, shown with a pet dog.
Figure 7:
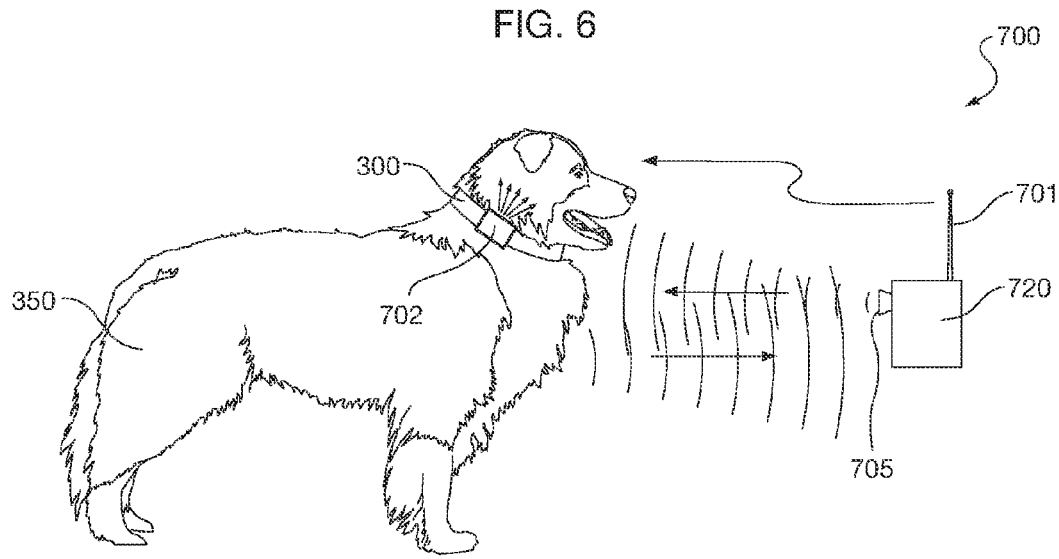
FIG. 7 is a schematic view of the animal behavior modification device of FIG. 1, shown with a pet dog.

In another embodiment, an animal behavior modification device in the form of a spray trainer may be used to deter a pet from entering an area. The area may be, for example, a bed, a couch, a floor, a table top, an item of furniture or a room. FIGS. 6 and 7 demonstrate embodiments of such spray training devices.

First, FIG. 6 illustrates a pet training device 600 wherein a pet training device 600 is separate and apart from the pet 350 to be trained. Such a device is similar to device 500 of FIG. 5 in that it is free-standing. In this instance, again, the pet 350 need not wear a collar. The device 600 may be moved from room-to-room or even packed and taken with the owner in a car to a new location.

Instead of a sound detection device, the device 600 includes a motion sensor 601. The motion sensor 601 is configured to sense the proximity of the pet 350. A housing for the motion sensor 601 is shown at 620. The motion detector 601 sends an activation signal in response to the detection of animal movement in the area of the device. The device 100 of FIG. 1 demonstrating a sensor 110 along with an optional amplifier 120, signal conditioner 130 and processor 140 is applicable to a motion sensor.

The device also includes a canister, such as tank 162. The canister 162 is again configured to hold a deterrent fluid at ambient pressure. The deterrent fluid may include a fragrance or chemical that is offensive to one or more senses of the pet. The canister 162 is further configured to reside on a surface, such as a table or a counter. In this embodiment, the canister 162 is not secured to the animal itself by means of a collar; rather, the canister 162 is free-standing and resides in the area from which the pet is to be deterred from entering.

The device additionally includes a non-pressurized pump, such as pump 164. The pump 164 is electrically coupled to the motion sensor 110 and is in fluid communication with the canister. The pump 164 includes a spray nozzle 166 for releasing, or discharging, a stream of the deterrent fluid in response to the electrical signals.

In one aspect, the device 600 further comprises an electrical motor. The motor is configured to draw fluid from the canister 162 in response to the electrical signals from the motion sensor 601. The motor includes a drive shaft. When activated, the motor causes the fluid to be discharged through the spray nozzle 166. In one embodiment, the pump 164 comprises an eccentric cam rotatably driven by the electrical motor to induce linear strokes, thereby pressurizing the liquid on demand coincident with the release of the deterrent fluid through the nozzle. An illustrative cam is shown in FIG. 4 of U.S. Pat. No. 4,727,385. The motor is preferably powered by a battery.

The activation signal automatically actuates the electrical motor to activate a pump 164, and draw fluid from the canister 162. This, in turn, causes a stream of the deterrent fluid to be automatically released through the spray nozzle 166. Thus, again a person does not have to be present to active the device 600. Indeed, it is preferred that such a device 600 only be used when human motion is not in the room to avoid accidentally triggering the motor associated with the pump 164.

Ideally, the device 600 is placed in an area wherein the dog 350 is taught not to enter, while the dog's movement does not activate the system 600 outside the range of the motion detector 601. In this manner, the dog 350 is taught not to enter select areas of a home or other space.

FIG. 7 illustrates a pet training device 700 in related embodiment. Here, the device 700 again includes a motion detector 705. The pet training device 700 also includes a remote transmitter 701. The motion detector 705 and the transmitter 701 are housed separately and apart from the collar 300 with the mounted spray device 702. A housing for the motion detector 705 and the transmitter 701 is shown at 720.

In operation, the remote transmitter 701 sends a wireless activation signal in response to the detection of pet movement by the motion sensor 705. The wireless activation signal is received by the collar mounted spray device 700 which then automatically actuates the electrical motor to activate a pump 164 for a period of time and draw fluid from the canister 162. The period of time may be, for example, 2 to 5 seconds. This, in turn, causes an emission of the deterrent fluid through the spray nozzle 166 associated with the collar 300. Thus, a person does not have to be present to active the remote transmitter 701. Accordingly, the remote transmitter may be placed in an area wherein the dog is taught not to enter, while the dog's movement does not activate the system should the movement occur outside the range of the remote transmitter. In this manner, the dog is taught not to enter select areas of a home.

In one aspect of the pet training device 700, either the housing 720 or the collar 300 includes a speaker (not shown). The speaker may emit ultrasonic sound waves audible only to the dog 350. The sound waves serve as a bark deterrent.

It will be appreciated that the inventions are susceptible to modification, variation and change without departing from the spirit thereof.

I claim:

1. An animal behavior modification device, comprising:
   a sound detection device configured to receive sound frequencies, and in response thereto generate electrical signals;
   a filter which conditions the electrical signals from the sound detection device to recognize frequencies characteristic of the bark of a dog;
   a first canister configured to hold a bark deterrent fluid at ambient pressure, wherein the bark deterrent fluid is offensive to one or more senses of a dog;
   a pump electrically coupled to the filter and in fluid communication with the first canister, the pump having an electrical motor and being configured to draw fluid from the first canister in response to conditioned electrical signals from the filter indicative of the bark of a dog;
   a spray nozzle configured to release an emission of the bark deterrent fluid when the electrical motor is activated;
   a battery arranged to provide power to the electrical motor and to circuitry associated with the filter;
   a receiver;
   a first housing for holding the first canister, the pump, the battery, the receiver and the spray nozzle, with the first housing being configured to be coupled to a collar of a dog; and
   a second housing separate from the first housing and being free-standing for holding the sound detection device and the filter, with the second housing further holding a transmitter for sending the conditioned electrical signals to the electrical motor.

2. The animal behavior modification device of claim 1, wherein the pump is a micro-positive displacement pump.

3. The animal behavior modification device of claim 1, further comprising:
   a speaker configured to emit a sound that precedes, is synchronous with, or that follows the emission of deterrent fluid also in response to conditioned electrical signals from the filter indicative of the bark of a dog.

4. The animal behavior modification device of claim 1, further comprising:
   at least one replacement canister configured to contain additional bark deterrent fluid; and
   wherein the replacement canister is configured to be threadedly connected to the pump as a replacement to the first canister at ambient pressure.

5. The animal behavior modification device of claim 1, wherein the spray nozzle is adjustable to generate a range of fluid spray emissions from streams to fine mist of the bark deterrent fluid.

6. The animal behavior modification device of claim 1, further comprising:
   a remote transmitter configured to send a wireless activation signal in response to manual actuation; and
   a receiver configured to receive the wireless activation signal, and in response generate an electrical behavior modification signal;
   wherein the electrical motor is configured to draw fluid from the first canister in response to the electrical behavioral modification signal from the receiver, and cause the bark deterrent fluid to be released through the spray nozzle.

7. The animal behavior modification device of claim 1, wherein the pump is a continuous stream pump or a single spray pump.

8. An animal behavior modification device, comprising:
   a sound detection device configured to receive sound frequencies, and in response thereto generate electrical signals;
   a filter which conditions the electrical signals from the sound detection device to recognize frequencies characteristic of the bark of a dog;
   a first canister configured to hold a bark deterrent fluid at ambient pressure;
   a micro-positive displacement pump electrically coupled to the filter and in fluid communication with the first canister, the pump having an electrical motor and being configured to draw fluid from the first canister in response to conditioned electrical signals from the filter indicative of the bark of a dog;
   a spray nozzle configured to release an emission of the bark deterrent fluid when the electrical motor is activated;
   a battery arranged to provide power to the electrical motor and to associated circuitry;
   a second canister containing a behavior reinforcement fluid, wherein the behavior reinforcement fluid comprises a solution that is pleasing to a dog's sense of smell, with the second canister being interchangeable with the first canister;
   a remote transmitter configured to send a wireless activation signal in response to manual actuation; and
   a receiver configured to receive the wireless activation signal, and in response thereto generate an electrical behavior modification signal;
   wherein the electrical motor is configured to draw fluid from the second canister in response to the electrical behavioral modification signal from the receiver, and cause the behavior reinforcement fluid to be released through the spray nozzle.

9. The animal behavior modification device of claim 1, wherein the first canister is fabricated from a bio-degradable material.

10. A method for modifying the behavior of an animal, comprising the steps of:
    providing an animal behavior modification device comprising:
      a sensor tuned to receive sound frequencies, and in response to generate electrical signals,
      a filter which conditions the electrical signals from the sensor,
      a first canister holding a bark deterrent fluid at ambient pressure,
      a micro-positive displacement pump electrically coupled to the filter and in fluid communication with the first canister, the pump having an electrical motor configured to draw fluid from the first canister in response to conditioned electrical signals from the filter indicative of the bark of a dog,
      a spray nozzle for releasing the bark deterrent fluid when the electrical motor is activated, and
      a battery arranged to provide power to the electrical motor and to associated electrical circuitry;
      a housing for holding at least the sensor, the filter, the pump and the battery;

securing the animal behavior modification device to a collar of a dog; and activating the pump in response to the sensing of a bark from the dog, thereby creating an emission of bark deterrent fluid to be released for a designated period of time.

11. The method of claim 10, wherein the animal modification device further comprises a speaker configured to emit a sound that emulates a spray of fluid also in response to conditioned electrical signals from the filter indicative of the bark of a dog.

12. The method of claim 10, further comprising the step of:

removing the first canister from the fluid intake when the bark deterrent fluid is substantially exhausted; and refilling the first canister with additional bark deterrent fluid, or replacing the canister with a new canister that contains a bark deterrent fluid at ambient pressure.

13. The method of claim 12, wherein:

the bark deterrent fluid comprises a solution that is offensive to one or more senses of a dog; and the animal behavior modification device further comprises a speaker configured to emit a sound that emulates a spray of fluid also in response to conditioned electrical signals from the filter indicative of the bark of a dog.

14. The method of claim 10, further comprising the step of:

adjusting the spray nozzle to generate either a fine mist or a fluid stream of the bark deterrent fluid when the electrical motor is activated.

15. The method of claim 10, wherein:

the animal behavior modification device further includes:

a remote transmitter configured to send a wireless bark deterrent signal in response to manual actuation; and a receiver configured to receive the wireless bark deterrent signal, and in response generate an electrical behavior modification signal; and wherein the electrical motor is configured to draw fluid from the first canister in response to the electrical behavioral modification signal from the receiver, and cause the bark deterrent fluid to be released through the spray nozzle for a period of time.

16. The method of claim 10, wherein:

the canister is fabricated from a bio-degradable material; and the animal behavior modification device further comprises a speaker configured to emit a sound that emulates a spray of fluid also in response to conditioned electrical signals from the filter indicative of the bark of a dog.

17. An animal behavior modification device comprising:

a sound detection device configured to sense surrounding sounds and to generate electrical signals in response to the sensing of sounds;

a processor configured to receive the electrical signals from the sound detection device and generate activation signals should the generated electrical signals from the sound detection device indicate that a sound condition indicative of a dog bark has been met;

a micro-positive displacement pump in fluid communication with a first fluid canister and electrically coupled to the processor, the pump being activated upon receiving the activation signal from the processor to pump a bark deterrent fluid contained within the first canister at ambient pressure, wherein the bark deterrent fluid is offensive to one or more senses of a dog;

a remote transmitter configured to send a bark deterrent signal in response to manual actuation; and a receiver configured to receive the bark deterrent signal, and in response generate an electrical behavior modification signal to an electrical motor configured to drive the pump;

a second canister containing a behavior reinforcement fluid at ambient pressure, wherein the behavior reinforcement fluid comprises a solution that is pleasing to a dog's sense of smell, and wherein the second canister is interchangeable with the first canister; and a nozzle in fluid communication with the pump to create a spray of the fluid for a period of time when the pump is activated.

18. The animal behavior modification device of claim 17, wherein the nozzle is an adjustable stream nozzle.

19. The animal behavior modification device of claim 17, wherein the electrical motor is configured to draw fluid from the first canister or the second canister in response to the electrical behavioral modification signal from the receiver, and cause fluid to be released through the spray nozzle by activation of the pump.

20. A method for modifying the behavior of an animal, comprising the steps of:

providing an animal behavior modification device comprising:

a sensor tuned to receive sound frequencies, and in response to generate electrical signals, a filter which conditions the electrical signals from the sensor, a first canister holding a bark deterrent fluid at ambient pressure, a micro-positive displacement pump electrically coupled to the filter and in fluid communication with the first canister, the pump having an electrical motor configured to draw fluid from the first canister in response to conditioned electrical signals from the filter indicative of the bark of a dog, a spray nozzle for releasing the bark deterrent fluid when the electrical motor is activated, and a battery arranged to provide power to the electrical motor and to associated electrical circuitry;

a housing for holding at least the sensor, the filter, the pump and the battery; and securing the animal behavior modification device to a collar of a dog; and activating the pump in response to the sensing of a bark from the dog, thereby creating an emission of bark deterrent fluid to be released for a designated period of time.

21. A method for modifying the behavior of an animal, comprising the steps of:

providing an animal behavior modification device comprising:

a sensor tuned to receive sound frequencies, and in response to generate electrical signals, a filter which conditions the electrical signals from the sensor, a first canister holding a bark deterrent fluid at ambient pressure, a micro-positive displacement pump electrically coupled to the filter and in fluid communication with the first canister, the pump having an electrical motor configured to draw fluid from the first canister in response to conditioned electrical signals from the filter indicative of the bark of a dog, a spray nozzle for releasing the bark deterrent fluid when the electrical motor is activated, a battery arranged to provide power to the electrical motor and to associated electrical circuitry, a receiver configured to receive wireless bark deterrent signals from a remote transmitter, a second canister containing a behavior reinforcement fluid, wherein the behavior reinforcement fluid comprises a solution that is pleasing to a dog's sense of smell, and wherein the second canister is interchangeable with the first canister; and a housing for holding at least the sensor, the filter, the pump and the battery;

securing the animal behavior modification device to a collar of a dog; and automatically activating the pump in response to the sensing of a bark from the dog, thereby creating an emission of bark deterrent fluid along the collar for a designated period of time;

manually activating a remote transmitter in order to send wireless bark deterrent signals to the receiver when the first canister is in the housing, and manually activating the remote transmitter to send wireless behavior reinforcement signal when the second canister is in the housing, thereby generating electrical behavior modification signals; and wherein the electrical motor is configured to draw fluid from the second canister in response to the electrical behavior reinforcement signal from the receiver, and cause a stream of the behavior reinforcement fluid to be released through the spray nozzle for a period of time.

22. An animal behavior modification device comprising:

a sound detection device configured to sense surrounding sounds and to generate electrical signals in response to the sensing of sounds;

a processor configured to receive the electrical signals from the sound detection device and generate activation signals should the generated electrical signals from the sound detection device indicate that a sound condition indicative of a dog bark has been met;

a micro-positive displacement pump in fluid communication with a fluid tank and electrically coupled to the processor, the pump being activated upon receiving the activation signals from the processor to pump a fluid that is offensive to one or more senses of a dog, wherein the fluid is a bark deterrent fluid held within the fluid tank at ambient pressure;

a remote transmitter configured to send a bark deterrent signal in response to manual actuation; and a receiver configured to receive the bark deterrent signal, and in response generate an electrical behavior modification signal to an electrical motor;

a speaker configured to emit a sound that either simulates the spray or that is ultrasonic in response to manual actuation using the remote transmitter; and a nozzle in fluid communication with the pump to create a spray of the fluid for a period of time when the pump is activated.

23. A method for modifying the behavior of an animal, comprising the steps of:

providing an animal behavior modification device comprising:

a motion sensor configured to sense movement of the pet, and in response to sensing movement to generate actuation signals;

a canister configured to hold a deterrent fluid at substantially ambient pressure;

a micro-positive displacement pump in fluid communication with the canister, the pump having an electrical motor and being configured to draw fluid from the canister in response to the actuation signals;

a spray nozzle configured to release a stream of the bark deterrent fluid when the electrical motor is activated;

a battery arranged to provide power to the electrical motor and to associated circuitry;

a first housing, wherein the first housing holds the motion sensor and a transmitter for transmitting the actuation signals; and a second housing, wherein the second housing holds the canister, the pump, the spray nozzle and the battery, and is configured to be coupled to the collar of the pet, and wherein the second housing further comprises a receiver for receiving the actuation signals and delivering them through circuitry to the electrical motor; and placing the motion sensor in an area where a pet is to be prevented from entering.

24. The method of claim 23, wherein the first housing further comprises a speaker configured to emit an ultrasonic signal audible to the dog in response to the actuation signals.

* * * * *